United States Patent [19]

Fujiwara et al.

[11] Patent Number: 4,541,573
[45] Date of Patent: Sep. 17, 1985

[54] FOOD PROCESSOR

[75] Inventors: Masakatu Fujiwara; Takeshi Miyamoto, both of Kasai; Hiroshi Kuzuhara, Sendai; Toshiya Morimoto, Kasai, all of Japan

[73] Assignee: Sanyo Electric Co., Ltd., Japan

[21] Appl. No.: 517,464

[22] Filed: Jul. 26, 1983

[30] Foreign Application Priority Data

Aug. 5, 1982 [JP] Japan ................................. 57-137034
Aug. 10, 1982 [JP] Japan ................................. 57-139610
Aug. 10, 1982 [JP] Japan ................................. 57-139611
Sep. 10, 1982 [JP] Japan ................................. 57-158395
Sep. 14, 1982 [JP] Japan ................................. 57-160093

[51] Int. Cl.$^4$ ............................................. B02C 25/00
[52] U.S. Cl. ................................. 241/36; 241/101.2; 241/282.1
[58] Field of Search ............................ 241/33–36, 241/95, 37.5, 101.3, 282.1, 282.2, 101.2

[56] References Cited

U.S. PATENT DOCUMENTS 4,174,073 11/1979 Maher et al. ................... 241/37.5 X
4,362,219 12/1982 Carlsson ...................... 241/101.3 X

FOREIGN PATENT DOCUMENTS 34903 4/1969 Japan .
1825 9/1980 Japan .

Primary Examiner—Mark Rosenbaum
Attorney, Agent, or Firm—Darby & Darby

[57] ABSTRACT

A food processor comprises a motor for rotating a rotor, a read-only memory (902) and a key input portion (600). In the read-only memory, a plurality of processing data are stored in advance. Each of the processing data includes a plurality of data groups consisting of speed data for determining the rotational speed of the motor and time data for determining the operation time of the motor. By operation of the key input portion (600), an arbitrary processing data is selected out of the plurality of processing data and the data groups included in the selected processing data are outputted successively from the read-only memory (902). According to these data groups, operation of the motor is controlled so that food is automatically processed.

6 Claims, 17 Drawing Figures

FOOD PROCESSOR

BACKGROUND OF THE INVENTION

1. Field of the Invention

The present invention relates to a food processor, and particularly to a food processor for processing food such as meat, vegetables and fruits by cutting, stirring, mixing and other food processing operations.

2. Description of the Prior Art

In a food processor, food to be processed, for example, meat, vegetables or fruits, is entered into a container so as to be subject to processing such as cutting and other operations by means of a rotor including, for example cutting blades, provided in the container. Such a food processor requires operating control such as speed control or operation time control of a rotor. An example of a conventional speed control is disclosed in the official gazette of Japanese Patent Laying-Open No. 1825/1980, for example. This gazette discloses a technique of speed control performed by the control of thyristors or triacs with variable operations of a rheostat, or by the conversion of turns of the field winding of a motor. However, for making the conversion of turns of the field winding of a motor, the size of a motor per se will have to be enlarged in some cases due to the number of turns, which will also enlarge the size of a food processor. On the other hand, an example of the control of operation time is disclosed, for example, in the official gazette of Japanese Patent Publication No. 34903/1973, where a technique of controlling operation time by means of time switches of electrical type or of mechanical type such as spring type is indicated. However, in case of using a mechanical time switch, such a time switch has a large size and the positioning thereof in a food processor will have to be limited in space, and in addition, the movable portion of a mechanical time switch is readily influenced by the environmental circumstances, causing lack of reliability. Furthermore, we may consider a food processor combining both of such speed control means and operation control means, but in such a food processor, if a rotor is once rotated and a time switch is turned off, it is necessary to newly set the time switch in order to rotate again the rotor in the same condition. In addition, ordinarily in using a food processor, it is sometimes needed to make control for gradually increasing the speed of the rotor, but in such a case, the rotational speed of the rotor has to be newly set each time, which is much inconvenient.

An example of a food processor improved in view of the above described disadvantages is disclosed in the official gazette of Japanese Patent Publication No. 28575/1982, which indicates a food processor wherein the speed data and the operation time data are selected by key switch groups and the selected data are stored in a random-access memory so that a motor for rotating the processor rotor is controlled based on the stored data. However, in such a food processor, only a single food preparation process is written in a random-access memory and read out so as to be used for the control of a motor, and in order to process a material with another process, it is necessary to write new data in the memory. Thus, in the above described food processor, the user must input food preparation data each time in accordance with the necessary food preparation process, which is extremely inconvenient.

Accordingly, it has been desired to make a food processor wherein various kinds of standard food preparation data are stored in a memory and a user selects the necessary data out of the stored data so that various materials can be automatically processed.

SUMMARY OF THE INVENTION

The present invention is, briefly, a food processor comprising: a rotor for processing food; a motor for rotating the rotor; storage means for storing a plurality of food preparation data in advance, each of the food preparation data including a plurality of data groups consisting of speed data for determining the rotational speed of the motor and time data for determining the operation time of the motor; selecting means for selecting arbitrary food preparation data out of the plurality of data so as to output the data groups included in the selected data successively from the storage means; and motor control means for controlling the rotational speed of the motor and the start-stop of the motor in response to the data groups from the storage means.

In accordance with the present invention, when the selecting means is operated, arbitrary food preparation data stored in advance in the storing means maybe selected out of the plurality of data and the data groups included in the selected data are outputted successively from the storing means. The motor control means controls the rotational speed of the motor and the start-stop of the motor in response to the data groups outputted from the storing means. As a result, in accordance with the present invention, automatic processing of food can be performed according to the data stored in advance.

Therefore, a principal object of the present invention is to provide a food processor that can perform a plurality of kinds of processing operations with simplified handling.

A principal advantage of the present invention is that by operation of the selecting means, an arbitrary kind of processing operation out of the plurality of kinds of operations can be automatically performed.

Another advantage of the present invention is that since food processing is performed automatically based on the data stored in advance, good reproducibility of the completed state of processing can be obtained.

A further advantage of the present invention is that if the processing data stored in advance are made optimum for each kind of food processing operation, optimum processing can be performed no matter who cooks.

These objects and other objects, features, aspects and advantages of the present invention will becomes more apparent from the following detailed description of the present invention when taken in conjunction with the accompanying drawings.

DESCRIPTION OF THE PREFERRED EMBODIMENTS

Figure 1:
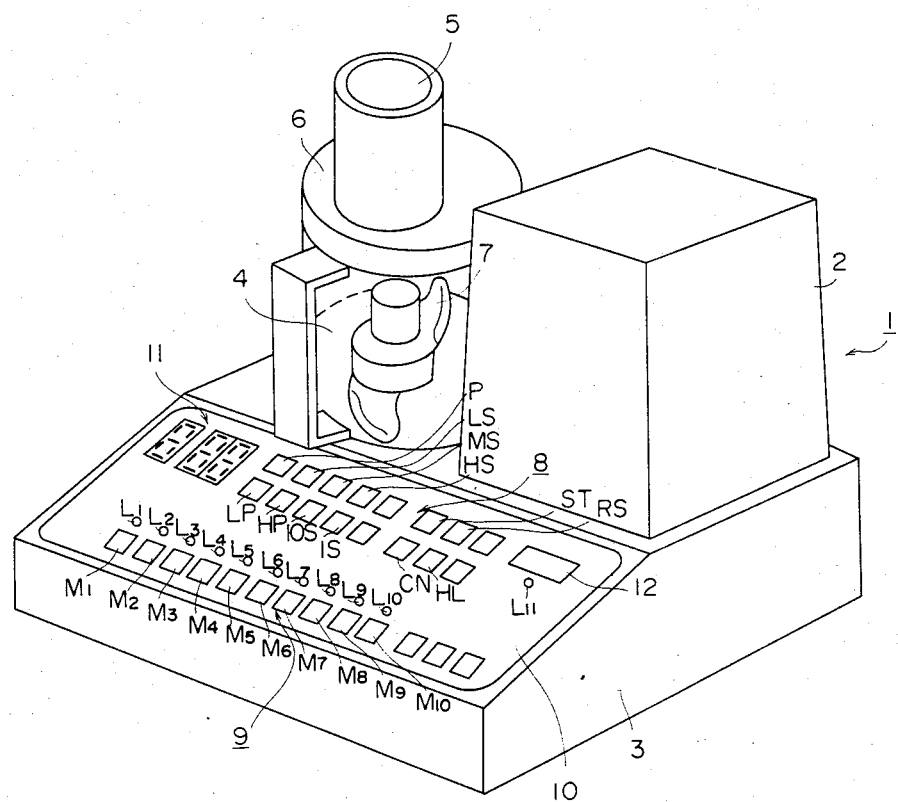
FIG. 1 is a perspective view of a food processor in accordance with an embodiment of the present invention.

FIG. 1 is a perspective view showing a food processor in accordance with an embodiment of the present invention. A food processor 1 comprises a base casing 3 which houses power transmission members and electric components, a motor casing 2 provided on the base casing 3 for housing a motor M (not shown) and a container 4 provided on the base casing 3 in a detachable manner. The container 4 is made of transparent resin, for example. A lid 6 having an entrance 5 for material is provided on the container 4. In the container 4, a rotor 7 for processing materials is rotatably provided so that it is rotated by the motor M. The rotor 7 may comprise cutting blades, for example. The form of the rotor 7 can be replaced according to the kinds of cooking operations.

On one surface of the base casing 3, a manual key switch group 8, an automatic key switch group 9, a display unit 11, a buzzer 12 and light-emitting diodes Ll to Lll are provided. The manual key switch group 8 includes various kinds of keys P, LS, MS, HS, LP, HP, 10S, 1S, ST, RS, CN and HL, the functions of which will be described afterward. The automatic key switch group 9 includes menu keys M1 to M10, the functions of which will be described also afterward. The surface of the above described key switch groups 8 and 9 etc. is covered with a cover 10 having flexibility such as soft vinyl chloride. The extremities of the cover 10 are fixed to the base casing 3 by melting or by using an adhesive agent. Indications corresponding to the key switches are given in the surface of the cover 10. Thus, as a result of providing the cover 10, infiltration of water into the key switch groups 8 and 9 etc. can be prevented in this type of food processor when water is usually used, and electrical insulation between the inside and the outside of the base casing 3 can be completely assured so that accidents due to short circuit can be avoided.

Figure 2:
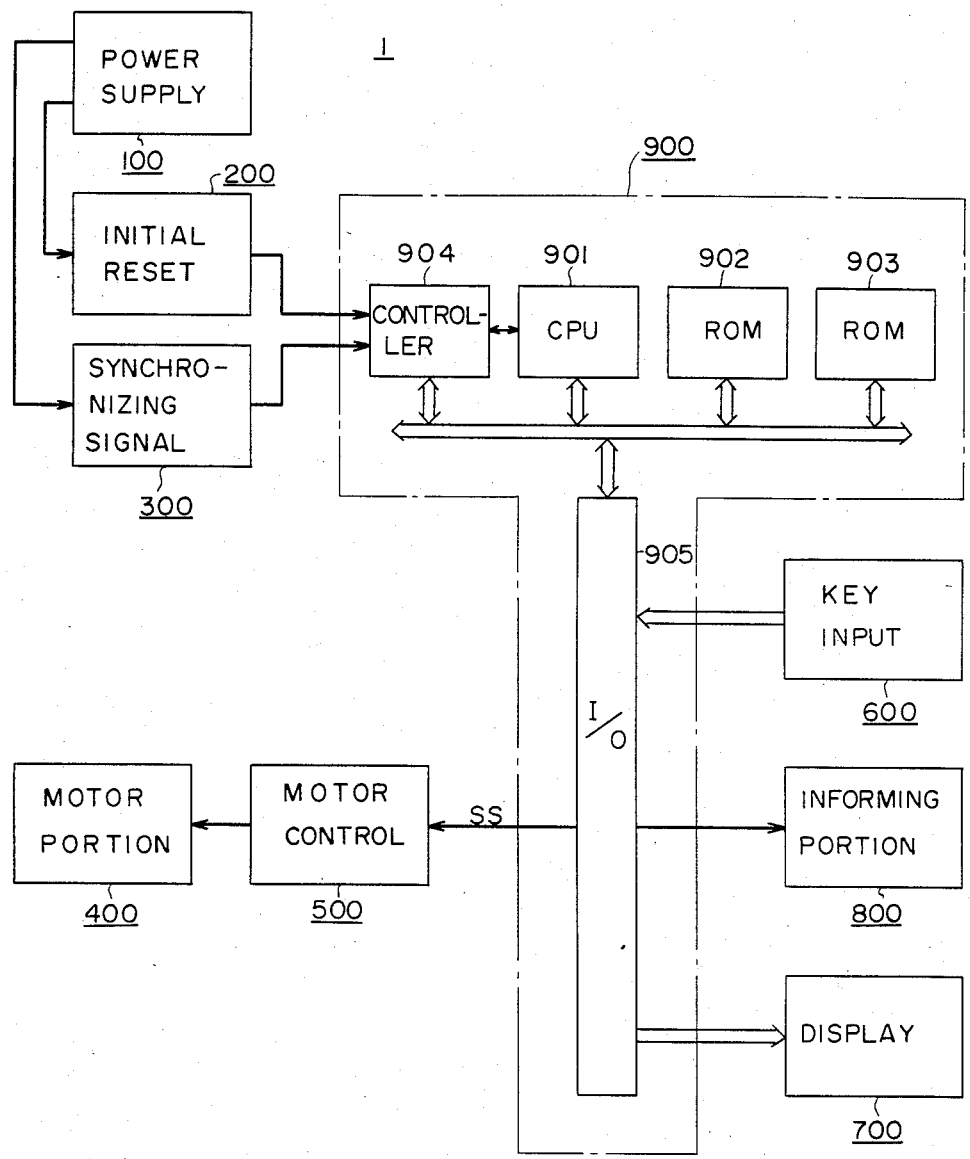
FIG. 2 is a block diagram of an embodiment of the present invention.

FIG. 2 is a block diagram of an embodiment of the present invention. The food processor 1 comprises a microcomputer 900 and an initial reset portion 200, a synchronizing signal generator 300, a motor control portion 500, a key input portion 600, a display portion 700 and an informing portion 800 which are all connected with the microcomputer 900. The initial reset portion 200 and the synchronizing signal generator 300 are further connected with a power supply 100. The motor control portion 500 is further connected with a motor portion 400. The microcomputer 900 comprises a central processing unit 901 and a read-only memory 902, a random-access memory 903, a controller 904 and an input-output unit 905 which are connected with the central processing unit 901. In the read-only memory 902, a plurality of food processing data are stored in advance. Each cooking data stored in the read-only memory 902 includes a plurality of data groups consisting of speed data for determining the rotational speed of a motor and time data for determining the operation time of a motor, an example thereof being shown in a table indicated below. In the present specification, the operation time of a motor includes a stop period at the time of intermittent operation. In the below indicated table, one example of processing data comprises ten processes for the purpose of facilitating the explanation. It will be clear, however, that this table is merely exemplary and that numerous other processes may be stored. In the read-only memory 902, ten, for example, kinds of processing data one of them being as shown in the table are stored. The mode data indicated in the table is data for determining whether the motor is driven continuously or intermittently, the numeral "1" indicating intermittent operation and the numeral "0" indicating continuous operation, which will be further explained afterward.

TABLE

| Process No. | Speed Data (r.p.m) | Time Data (sec) | Mode Data |
|---|---|---|---|
| 0 | 1600 | 3 | 1 |
| 1 | 3300 | 4 | 1 |
| 2 | 2200 | 33 | 0 |
| 3 | 1600 | 10 | 0 |
| 4 | 2200 | 5 | 0 |
| 5 | 1600 | 10 | 0 |
| 6 | 2200 | 5 | 0 |
| 7 | 1600 | 10 | 0 |
| 8 | 2200 | 5 | 0 |
| 9 | 1600 | 15 | 0 |

The key input portion 600 comprises the above described manual key switch group 8 and automatic key switch group 9. By operation of the automatic key switch group 9, arbitrary processing data out of a plurality of data stored in the read-only memory 902 is selected and the data groups included in the selected data are outputted successively from the read-only memory 902. The data groups outputted from the read-only memory 902 pass through the central processing unit 901 and the input-output unit 905 and are applied to the motor control portion 500 as a speed signal SS. The motor control portion 500 responds to the speed signal SS so as to control the rotational speed of the motor M in the motor portion 400 and the start-stop of the motor M. The power supply 100 furnishes electric power to the initial reset portion 200 and the synchronizing signal generator 300. The initial reset portion 200 provides a reset signal to the microcomputer 900 at the time of turning on of the power supply so as to start the operation of the microcomputer 900. The synchronizing signal generator 300 provides a synchronizing signal to the microcomputer 900. The display portion 700 displays a content according to the key operation of the key input portion 600. The informing portion 800 signals with sound that processing is completed.

Figure 3:
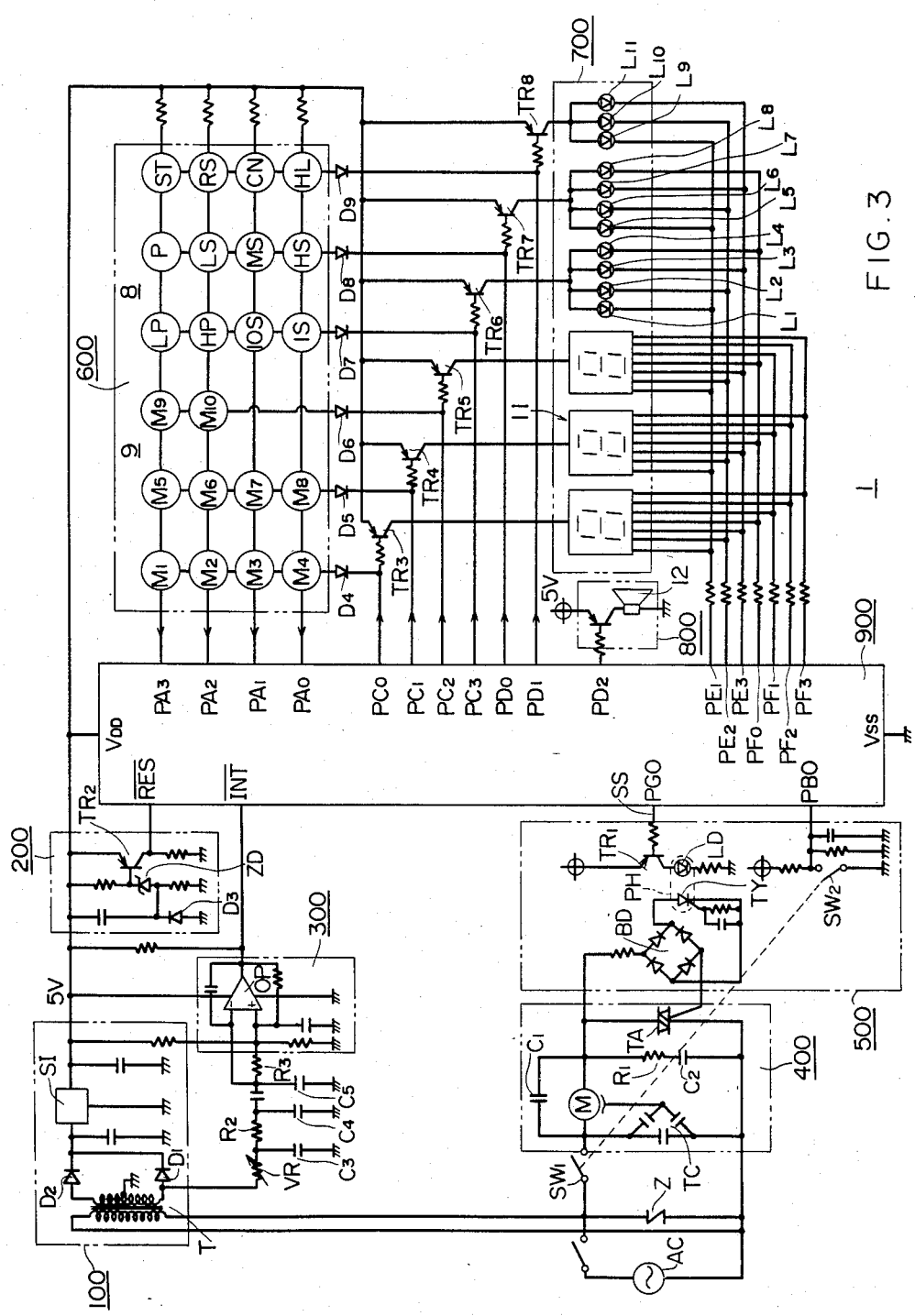
FIG. 3 is a circuit diagram of an embodiment of the present invention.

Now, the block diagram shown in FIG. 2 will be explained in detail. FIG. 3 is a circuit diagram of an embodiment of the present invention. The microcomputer 900 comprises input ports $\overline{RES}$, $\overline{INT}$, PA0 to PA3 and PB0, output ports PC0 to PC3, PD0 to PD2, PE1 to PE3 and PF0 to PF3 and power supply terminals $V_{DD}$ and $V_{SS}$. The power supply 100 comprises a transformer T, diodes D1 and D2 and a constant-voltage circuit SI. The electric power from the alternating current power supply AC is stepped down by the transformer T and rectified by the diodes D1 and D2 so that constant voltage (5 volts, for example) is applied by means of the constant-voltage circuit SI toward the power supply terminal $V_{DD}$ of the microcomputer 900 etc.

The initial reset portion 200 comprises a diode D3, a zener diode ZD and a transistor TR2. The initial reset portion 200 supplies a reset signal to the input port $\overline{RES}$ of the microcomputer 900 at the time when electric power is supplied to the food processor 1, so that the microcomputer 900 starts operation.

The input side of the synchronizing signal generator 300 is connected to the secondary side of the transformer T through a filter portion comprising a variable resistor VR, resistors R2 and R3 and capacitors C3 to C5 etc.

The synchronizing signal generator 300 comprises an operational amplifier OP etc., and operates to output square waves of a width of 2 to 3 m sec with frequency of 50 Hz or 60 Hz, which are supplied to the input port $\overline{INT}$ of the microcomputer 900. Thus, the microcomputer 900 is enabled to count per second with high accuracy the operation time of the motor M.

The motor portion 400 comprises the above described motor M, a triac TA, a capacitor TC for absorption of noise, capacitors C1 and C2 and a resistor R1. The motor M is a commutator motor, for example. By means of the resistor R1 and the capacitor C2, noise is prevented from entering into the triac TA so as to avoid mistriggering of the triac TA. The input of the motor portion 400 is connected to the power supply AC and a noise absorbing element Z.

The motor control portion 500 comprises a transistor TR1 connected to the output port PG0 of the microcomputer 900, a photo-coupler connected to the transistor TR1 and a bridge rectifier BD connected to the photo-coupler and to the triac TA. The photo-coupler PH comprises a light-emitting diode LD and a thyristor TY. When the light-emitting diode LD emits light, the thyristor TY becomes conductive as a result. The motor control portion 500 is responsive to the speed signal SS outputted from the output port PG0 of the microcomputer 900 and operates to change the rotational speed of the motor M in the motor portion 400 and also controls start-stop of the motor M.

The key input portion 600 comprises the manual key switch group 8 and the automatic key switch group 9, as described above. The keys LP, HP, 10S, 1S, P, LS, MS, HS, ST, RS, CN and HL included in the manual key switch group 8 and the menu keys M1 to M10 included in the automatic key switch group 9 constitute a matrix of 4 rows×6 columns. This matrix is connected to the input port PA0 to PA3 and the output ports PC0 to PC3 and PD0 and PD1 of the microcomputer 900, whereby the microcomputer 900 determines which key is pressed. The automatic key switch group 9 corresponds to the read-only memory 902 in the microcomputer 900. More specifically, by operation of an arbitrary menu key out of the menu keys M1 to M10 included in the automatic key switch group 9, arbitrary food processing data is selected out of the plurality of data stored in advance in the read-only memory 902, so that a speed signal SS corresponding to the selected food processing data is outputted from the output port PG0. The manual key switch group 8 is used when the user wants to make the microcomputer 900 store food processing data according to his own preference. Thus, the cooking functions of the food processor can be diversified. The manual key switch group 8 corresponds to the random-access memory 903 in the microcomputer 900 and the contents corresponding to the operation of each key in the manual key switch group 8 are stored in the random-access memory 903. The key P serves to stop the operation of the motor M; the key LS serves to operate the motor M at low speed; the key MS serves to operate the motor M at medium speed; the key HS serves to operate the motor M at high speed; the key LP serves to operate the motor M intermittently at low speed; the key HP serves to operate the motor M intermittently at high speed, the frequency of intermittent operation being 0.5 second, for example; the key 10S serves to operate the motor M for 10 seconds; the key 1S serves to operate the motor M for a second. The start key ST serves to start processing; the reset key RS serves to clear the data stored temporarily in the random-access memory 903 for manual operation; the continuous operation key CN serves to continuously operate the food processor; the temporary stop key HL serves to temporarily stop the food processing operation.

The display portion 700 comprises a digital display unit 11 and light-emitting diodes L1 to L11. When the key switches in the above described key input portion 600 are turned on, the microcomputer 900 emits a signal of five digits from the output ports PC0 to PC3 and PD0 and PD1. In consequence, the transistors TR3 to TR7 are suitably turned on, and then the display unit 11 and the light-emitting diodes L1 to L11 are suitably turned on, so that a desired display can be made.

The informing portion 800 comprises a buzzer 12 connected to the output port PD2 of the microcomputer 900. When a food processing operation comes to an end, a signal is outputted from the output port PD2, whereby the buzzer 12 sounds to inform the operator that food processing is completed.

Meanwhile, both a switch SW1 connected to the input side of the motor M and a switch SW2 connected to the input port PB0 of the microcomputer 900 may comprise well known safety switches. They are turned off when the lid 6 is opened, while they are tunrned on when the container 4 is closed by the lid 6 at a predetermined position. The food processor 1 does not operate when the switches SW1 and SW2 are turned off.

Figure 4A:
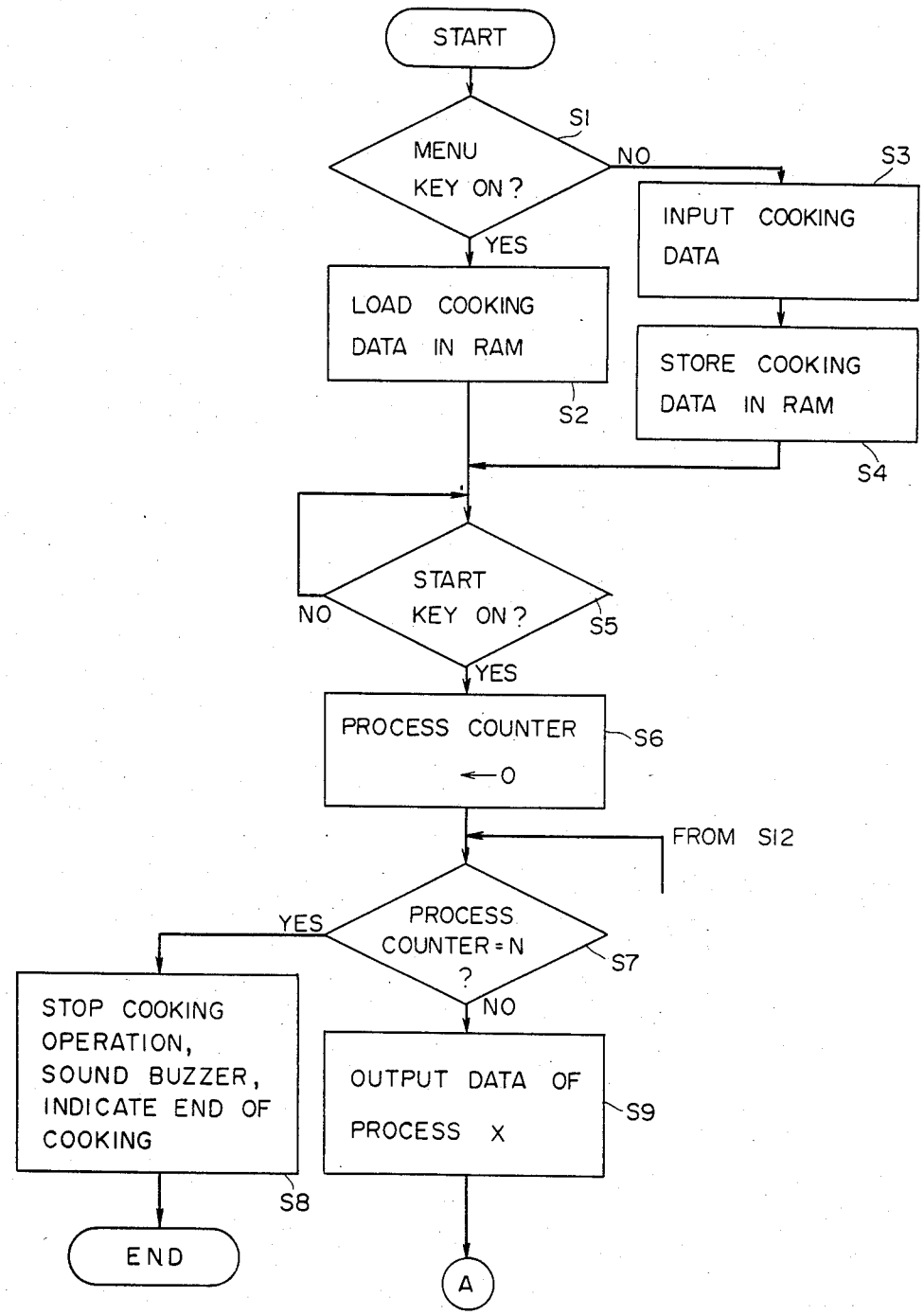
FIGS. 4a and 4b are flow charts showing the operation of an embodiment of the present invention.
Figure 4B:
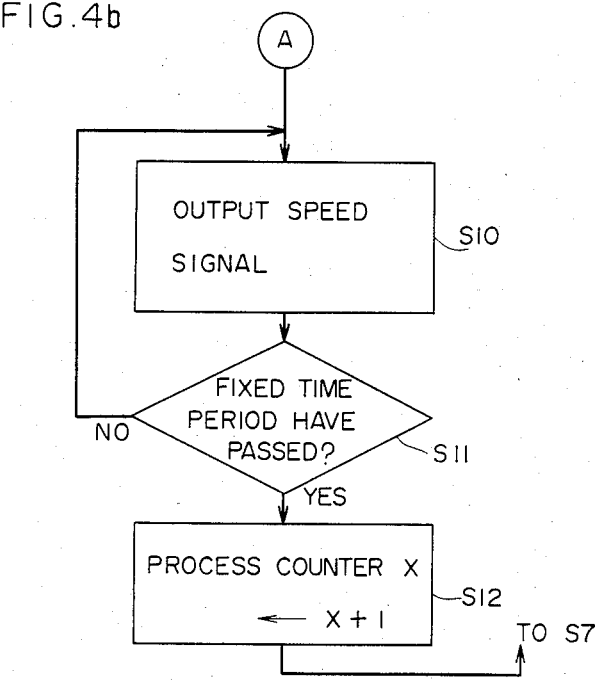
Figure 5:
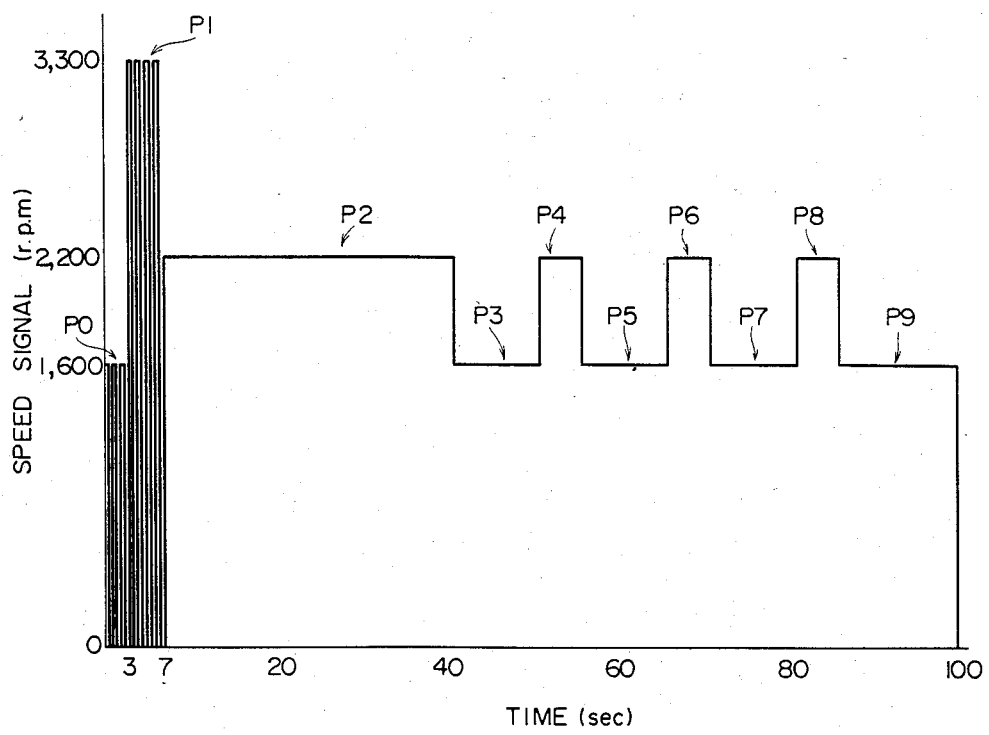
FIG. 5 is a graph showing changes in a speed signal.

Next, an overall operation of an embodiment of the present invention will be described. FIGS. 4a and 4b are a flow chart showing the operation of an embodiment of the present invention. FIG. 5 is a graph showing changes in a speed signal. First, the manual or automatic cooking operation is selected. If any one of the keys in the automatic key switch group 9 is pressed, the automatic food processing operation is selected. If any one of the keys in the manual key switch group 8 is pressed, the manual food processing operation is seleced. Now, let us assume that the automatic operation is selected so as to prepare dough for pizza, for example. In the step S1, it is determined whether any one of the menu keys is turned on or not. When a menu key for pizza, the menu key M1, for example, is pressed, the light-emitting diode L1 emits light. In the step S2, the food processing data for pizza stored in advance in the read-only memory 902 is loaded temporarily in the random-access memory 903. In the step S5, it is determined whether the start key ST is turned on or not. When the start key ST is turned on, the numeral 0 is inputted in the process counter in the microcomputer 900 in the step S6. In the step S7, it is determined whether the content of the process counter is N or not. N indicates the final process number in one food processing data and in this example, N is 9. As the content of the process counter is 0 at this time, the program proceeds to the step S9, in which the data of process 0 is outputted from the random-access memory 903. In the step 10, this data is converted into a speed signal SS, which is outputted from the output port PG0 of the microcomputer 900. The data of process 0 in this case indicates 1600 r.p.m. in the speed data, 3 seconds in the time data, and "1" in the mode data, i.e. the intermittent operation mode, as shown in the above table. At this time, the display unit 11 displays "1" indicating low speed and "03" indicating operation time. The motor control portion 500 which receives the speed signal SS makes control to rotate the motor M in the motor portion 400 at the speed of 1600 r.p.m. In the step S11, it is determined whether a fixed period of time, for example 3 seconds have passed or not. If not, the program returns to the step S10 and speed signals are output successively, and when the fixed period of time has passed, the program proceeds to the step S12, in which 1 is added in the content of the process counter. Then, the program returns to the step S7. In such a manner as described above, data corresponding to each process is output from the memory till the content of the process counter becomes 9 and processing is performed according to the output data. When processing in a certain process is completed, an immediately subsequent process is automatically loaded. Thus, cooking in the processes P0 to P9 is automatically performed so as to prepare dough for pizza. When processing in the process P9 is completed, the program proceeds to the step S8, in whicn the cooking operation is brought to an end, the buzzer 12 sounds and the light-emitting diode L11 emits light, thus indicating the end of food processing.

Referring again to FIG. 5, when materials for pizza, i.e. flour, yeast plant, butter, eggs, water etc. are put into the container 4 and the menu key M1 for pizza is turned on, mixing of these materials is performed in the processes P0 and P1. In this case, by performing alternatively the intermittent operation at low speed and the intermittent operation at high speed, a uniform mixture of the materials can be obtained. If continuous operation at high speed is performed directly from the beginning, irregularities in the mixture will be caused due to spattering of the materials etc. Such problem is solved by performing intermittent operation at low speed and at high speed. In the processes P2 to P9, dough in small pieces is made to be a mass, and thus the dough is sufficiently kneaded. The reason for performing alternatively the operations at low speed and at medium speed is that there should not be any irregularities in mixture in the dough. In this case, if processing continues even after the process P9, the dough will be excessively kneaded and the temperature of the dough will become too high, which will cause the yeast to be ineffective, and in addition, the coherence of the compound will become too strong, which will make the pizza unsavory.

Referring again to FIG. 4, in case where the user selects manual processing, in the step S3, the keys in the manual key switch group 8 are appropriately operated so that a series of data consisting of speed data and operation time data is inputted in the microcomputer 900 according to his own preference. In the step S4, data input from the manual key switch group 8 is stored in the random-access memory 903. When the start key ST is pressed in the step S5, the data is output from the memory in the subsequent steps in the order input by tne user and according to the data, cooking is performed automatically. When all the cooking data is outputted, the buzzer 12 sounds and the light-emitting diode L11 emits light in the step S8, and thus processing is completed.

As described in the foregoing, in accordance with this embodiment, an arbitrary kind of food processing operation out of a plurality of kinds of operations is automatically performed. Furthermore, the completed state of food processing can be with good reproducibility, and if the food processing data stored in advance in the read-only memory 902 are made optimum for each food processing operation, optimum processing can be performed no matter who cooks. In addition, if a manual key switch group 8 as in this embodiment is provided, the user can select freely the rotational speed of a rotor and the operation time according to his own preference, and as a result, a food processor of the present invention can be used suitably for cooking in various countries having different customs which will further increase the commercial value of the food processor.

In the speed control of the rotor 7, it is preferred, for the purpose of improving the food processing, to increase or decrease continuously and gradually the rotational speed of the rotor 7 instead of it discontinuously changing the rotational speed of the rotor 7 from low speed to high speed and vice versa. In order to make such gradual change, the motor M has only to be driven intermittently at short intervals. Then, the rotational speed of the rotor 7 will change continuously and gradually due to the inertia of the motor M and the rotor 7. In the following, description will be made of an embodiment in which the motor M is intermittently driven with at least two kinds of rotational speed.

The following embodiment is described mainly with regard to different points compared with the above described embodiment. Also, in the following embodiment, description is made mainly of the case of automatic food processing; however, it will be the same with the case of manual food processing.

Figure 6:
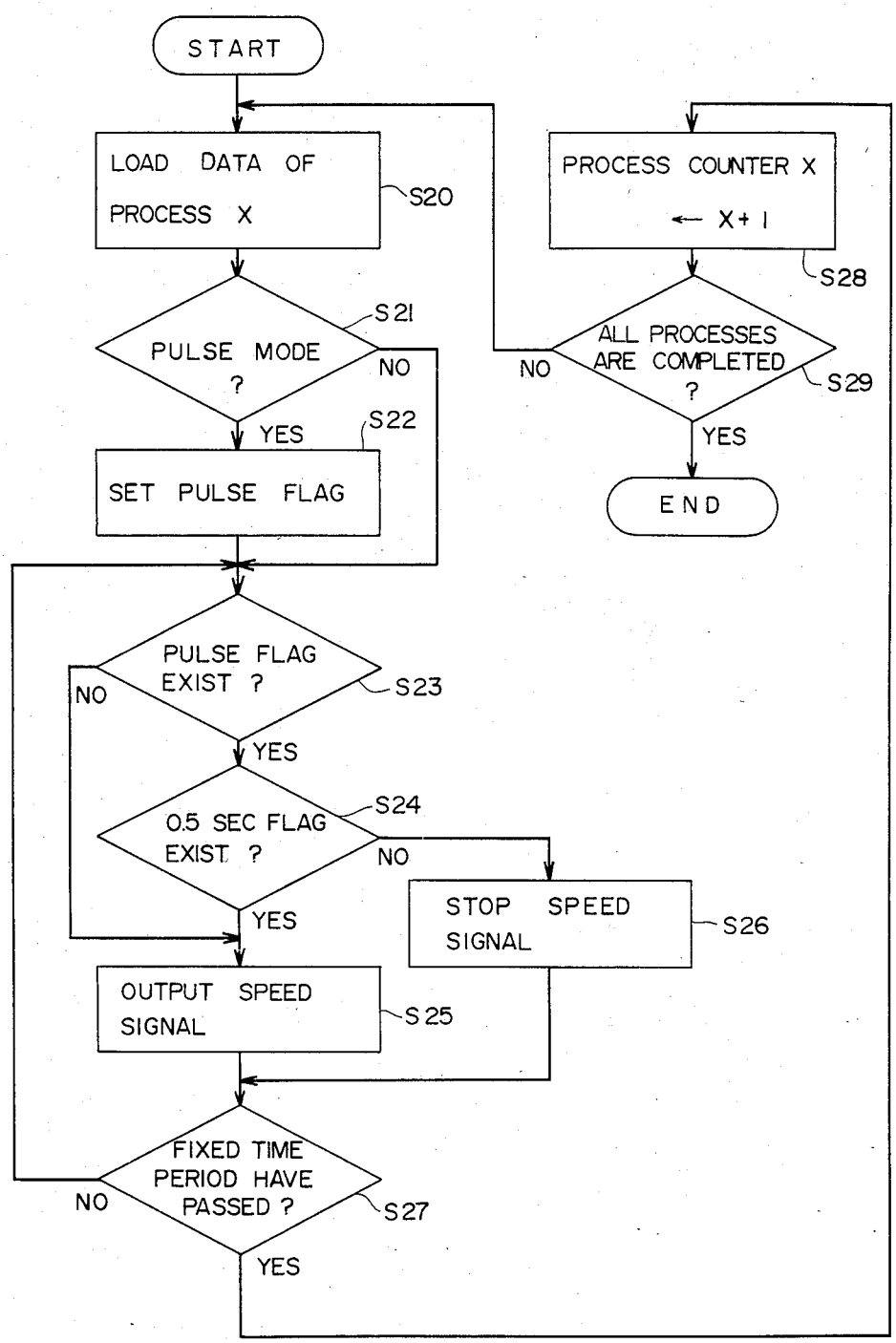
FIG. 6 is a flow chart showing the operation of another embodiment of the present invention.

FIG. 6 is a flow chart showing the operation of another embodiment of the present invention. In the step S20, data in a certain process out of the food processing data is loaded. In the step S21, it is determined whether the data indicates a pulse mode, i.e. an intermittent operation mode. This determination is made with the mode data included in the food processing data, as described above. More particularly, if the mode data is 1, it is the pulse mode; if the mode data is 0, it is the continuous operation mode. In case of the pulse mode, a pulse flag is set in the microcomputer 900 in the step S22. In the step S23, it is determined whether a pulse flag exists or not. In the step S24, it is determined whether a flag of 0.5 sec. exists or not. The flag of 0.5 sec. is set every 0.5 second in the microcomputer 900. If the flag of 0.5 sec. exists, the program proceeds to the step S25, in which a speed signal SS corresponding to the fixed rotational speed is output only for 0.5 second. Then, the motor M is driven for 0.5 second. If the flag of 0.5 sec. is not set, the program proceeds to the step S26, in which a speed signal SS is not outputted and the motor M is not driven. In tne step S27, it is determined whether a predetermined period of time has passed or not. If not, the program returns to the step S23, where a speed signal SS is intermittently output in the same manner as described above. When the predetermined period of time has passed, the program proceeds to the step S28, where 1 is added to the content of the process counter. In the step S29, it is detetmined whether all the processes are completed or not. If not, the program returns to the step S20, where the data in the subsequent process is loaded again and the same operation as described above is repeated.

Figure 7:
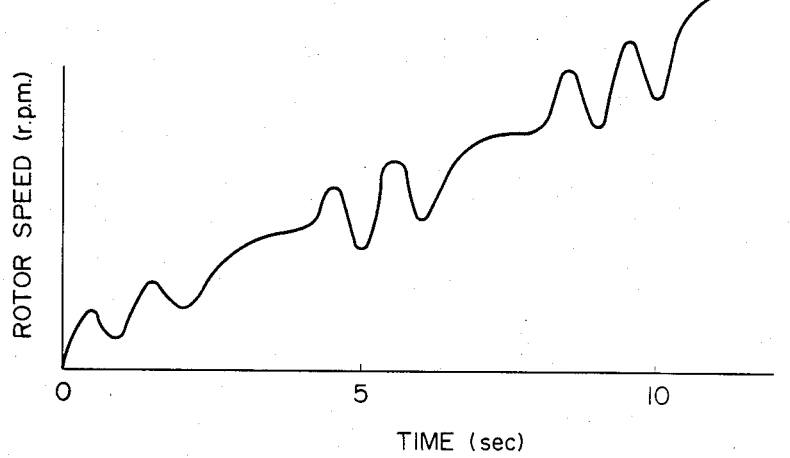
FIG. 7 is a graph showing changes in the rotational speed of a rotor.
Figure 8:
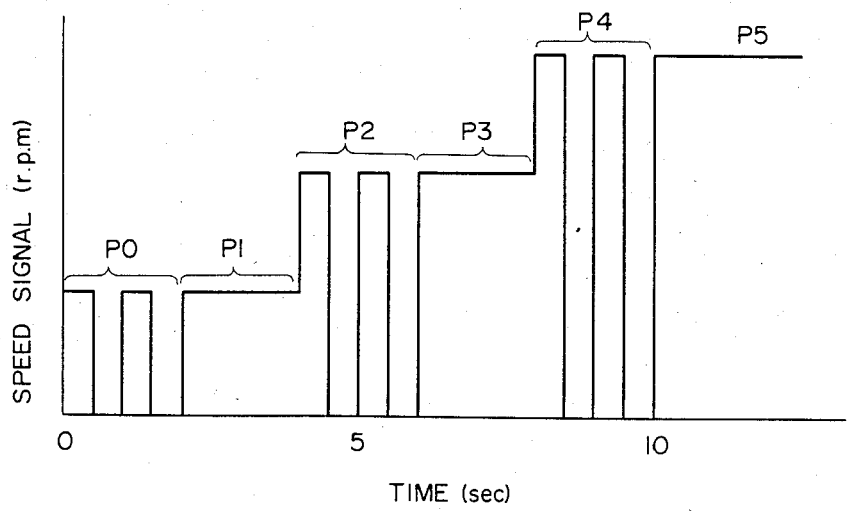
FIG 8. is a graph showing changes in a speed signal.

FIG. 8 is a graph showing changes in the speed signal SS output from the output port PG0 of the microcomputer 900 by the operation in accordance with the flow chart shown in FIG. 6. FIG. 7 is a graph showing changes in the rotational speed of the rotor 7 at that time. Referring to FIG. 8, speed signal SS of low speed is intermittently output every 0.5 second in the process P0; in the process P1, a speed signal of low speed is continuously output; in the process P2, a speed signal SS of medium speed in intermittently outputted; a speed signal SS of medium speed is continuously output in the process P3; a speed signal of high speed is intermittently output in the process P4; a speed signal SS of high speed is continuously output in the process P5. Referring to FIG. 7, in case where the speed signals SS output from the microcomputer 900 are those indicated in FIG. 8, it can be seen that the rotational speed of the rotor increases almost linearly.

In the above described embodiment, even if the material to be processed has a large volume, processing operation such as cutting etc. can be easily performed and there is little fear that the rotor might be locked by the material to be cooked and therefore, overheating due to such phenomenon will not occur in the motor. Furthermore, when the motor stops, the material is stirred due to inertia, and by repetition of cutting and stirring operations, the material can be cut in fine pieces in a short period of time.

Figure 9:
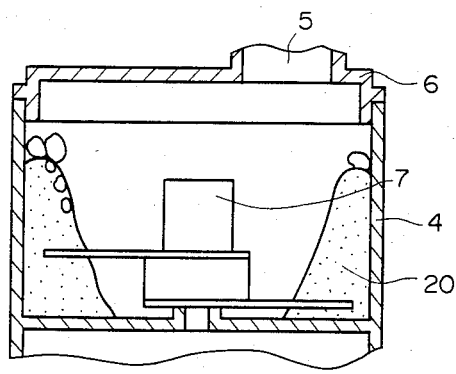
FIG 9. is a sectional view showing the state of the material at the time of cooking.

In case of increasing the rotational speed of the motor from a low speed to a medium speed and further to a high speed, if the motor is intermittently rotated with stop periods being inserted, it might be required to supply an excessive amount of electric power to the motor depending on the state of the material to be cooked. In addition, in case where the rotational speed of the motor changes intermittently from a low speed to a medium speed, or from a medium speed to a high speed, relative speed is increased at the time of changing the rotational speed, and the material is sometimes spattered around the rotor and cannot be collected near the rotor with efficiency, causing irregularities in the completed state of the food or adhesion of the spattered material to the container which makes a considerable amount of material wasted and also makes it troublsome to wash the container. FIG. 9 is a sectional view showing. the state of the material bieng processed, where he material 20 is spattered around the rotor 7. Then, we will describe hereafter an embodiment in which a uniform state of completion can be obtained and a wasted amount of material caused by spattering of the material to the inner surface of the container can be avoided.

Figure 10:
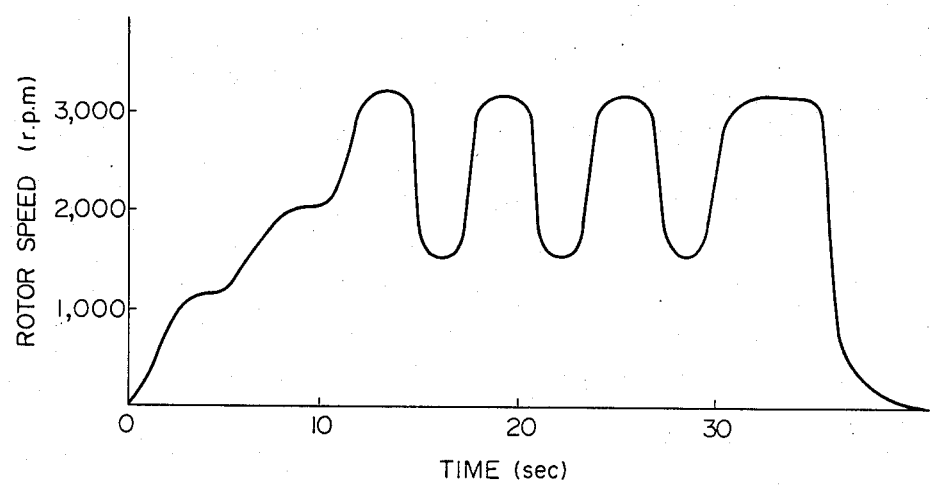
FIG. 10 is a graph showing changes in the rotational speed of a rotor.
Figure 11:
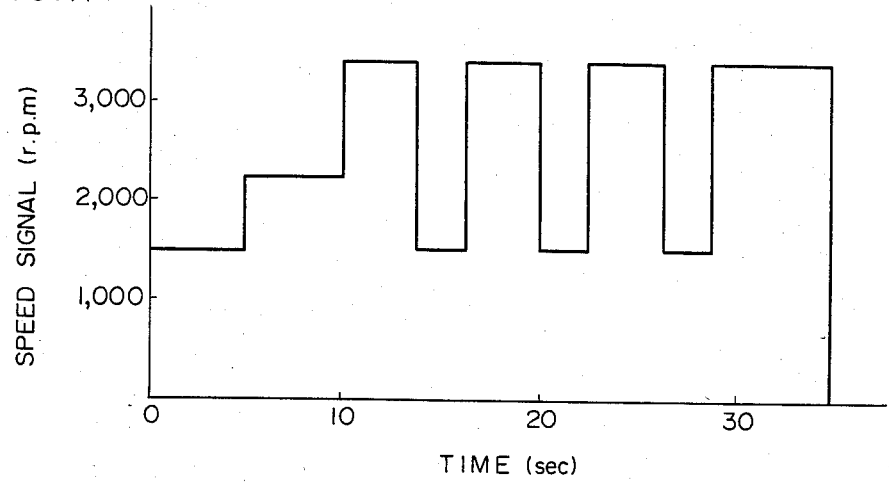
FIG. 11 is a graph showing changes in a speed signal.

FIG. 11 is a graph showing changes in a speed signal in a further embodiment of the present invention and FIG. 10 is a graph showing changes in the rotational speed of the rotor in case where the speed signal changes as shown in FIG. 11. Referring to FIG. 11, in the above described read-only memory 902. data groups of speed data and time data are stored, the data groups being, for example, a data group of 1600 r.p.m. and 5 seconds, a data group of 200 r.p.m. and 5 seconds, a data group of 3300 r.p.m. and 4 seconds, a data group of 1600 r.p.m. and 2 seconds, a data group of 3300 r.p.m. and 4 seconds, a data group of 1600 r.p.m. and 2 seconds, a data group of 3300 r.p.m. and 4 seconds, a data group of 1600 r.p.m. and 2 seconds and a data group of 3300 r.p.m. and 5 seconds. As a result, the speed signals outputted from the microcomputer 900 are as shown in FIG. 11. Such processing data may be inputted by the user by means of the manual key switch group 8.

Figure 12:
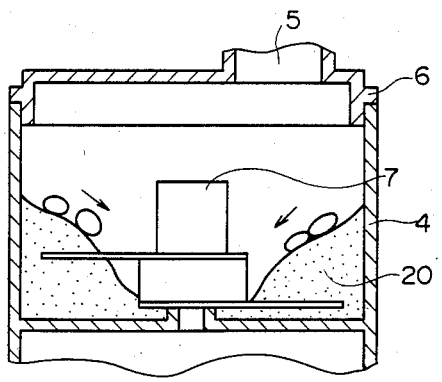
FIGS. 12 and 13 are sectional views showing the state of the material at the time of cooking.
Figure 13:
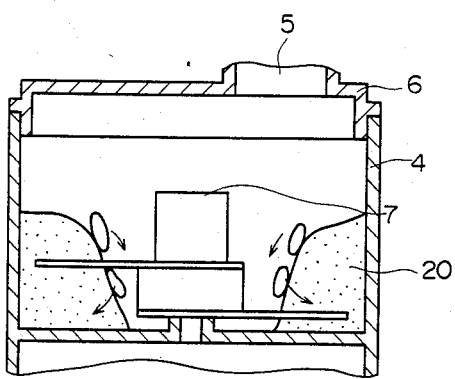

If the speed signals SS are as shown in FIG. 11, the rotational speed of the motor M increases continuously at fixed intervals immediately after the start of processing from a low speed to a high speed through a medium speed and after that operations between the low speed and the high speed are alternatively repeated at fixed intervals, which state is shown in FIG. 10. Accordingly, the material 20 put into the container 4 is uniformly stirred and gradually crushed in the process where the rotational speed of the rotor increases gradually from a low speed to a medium speed and further to a high speed. Then, the material 20 is crushed at once at high speed. After that, the rotational speed of the rotor changes from a high speed to a low speed. and from a low speed to a high speed, and thus the above described processing operation is repeated. The state of the material in this operation is shown in FIGS. 12 and 13. FIG. 12 shows a state of the material when the rotational speed of the motor M decreases from a high speed to a low speed; at this time the material 20 rising closely along the inner surface of the container 4 falls to be collected around the rotor 7. FIG. 13 is a state when the rotational speed of the motor M changes from a low speed to a high speed; at this time, the material 20 is drawn into the bubbles generated by the rotor 7 so as to be crushed.

Thus, in the above described embodiment, rough pieces of material, spattered to the inner surface of the container, which would not be mixed into the whole material in a conventional food processor are collected to the center when the motor is rotated at low speed and are drawn into the bubbles generated by the rotor and crushed when the rotational speed is increased to a high speed, and thus a uniformly completed state of the food can be obtained. In addition, since by spattering of the material, few pieces adhere to the upper surface or the circumferential surface of the container, it becomes easy to take out the material from the container and to wash the container.

In case where flour and water are mixed up by a food processor, the flour remains in the form of powder immediately after the start of cooking and in accordance with the kneading, its viscosity is increased and load applied to the motor becomes large. For this reason, conventionally, a motor is continuously driven at high speed (3300 r.p.m., or example) or at medium speed (2200 r.p.m., for example) from the beginning of the processing operation in order that the motor can withstand a high load after the material is sufficiently kneaded. However, if the motor is driven at high or medium speed from the beginning, the powder will be spattered all around by the rotor and will stick to the surface of the container or near the entrance for material and such sticking particles of material will not be mixed with water and thus wasted. On the other hand, if the motor is continuously driven at medium speed at a time, irregularities in mixture are caused and the completed state is not good. Therefore, finally, we will describe an embodiment in which spattering of the material can be avoided and a uniform mixture can be obtained. In this embodiment, the motor is intermittently driven at low speed and then, the motor is intermittently driven at high speed, and after that, the motor is continuously driven at medium speed.

Figure 15:
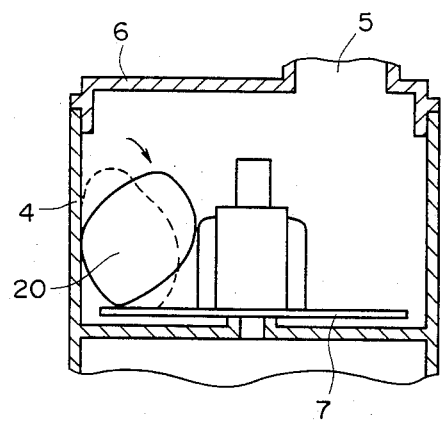
FIG. 15 is a sectional view showing the state of the material at the time of processing.
Figure 14:
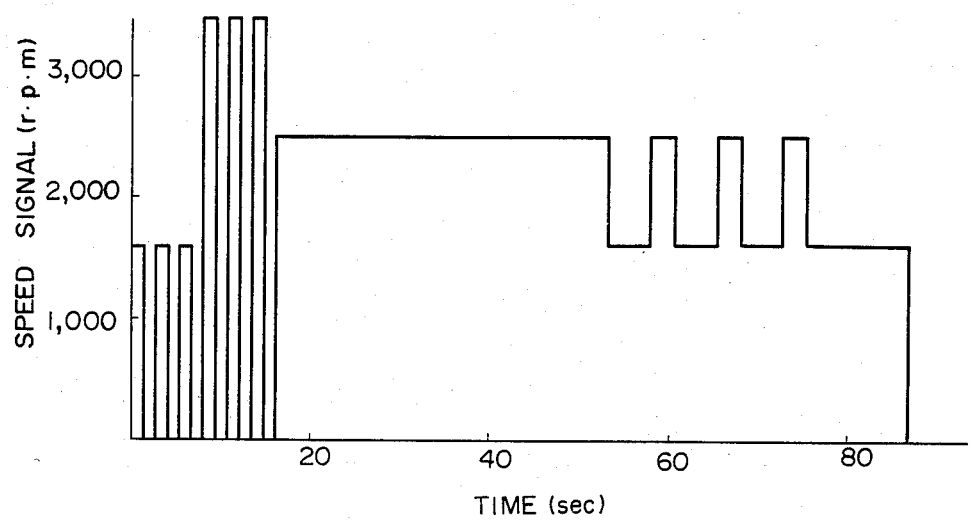
FIG. 14 is a graph showing changes in a speed signal.

FIG. 14 is a graph showing changes in a speed signal SS and FIG. 15 is a sectional view showing the state of the material being processed. The processed data corresponding to the speed signal SS in FIG. 14 is stored in the read-only memory 902 in the microcomputer 900. According to the processed data, the motor is driven with 1600 r.p.m. for 9 seconds at intervals of 1.5 seconds immediately after the start of driving. During this period, the material 20 does not spatter nor adhere to the surface of the container 4 or near the entrance 5 for material; water and flour are roughly mixed up by soft force and small pieces of mixture of water and flour are crushed by the intermittent operation so as to be dispersed to the flour portion not mixed with water. Accordingly, few amount of flour or other material is splashed and pieces of material containing water are uniformly distributed. Then, the motor is intermittently driven at a high speed of 3300 r.p.m. for 9 seconds whereby the material becomes a mass as a whole and again crushed into pieces by the rotor and thus this cycle of operation is repeated. As a result, water is uniformly mixed in the whole flour and the material is partially kneaded. After that, the processing pattern proceeds to the next stage, where the motor M is continuously driven at a medium speed of 2500 r.p.m. for 35 seconds. Since flour and water are mixed up almost uniformly in the previous driving pattern, the material is forcefully kneaded as a whole in this driving pattern. At last, the motor is driven alternatively at low speed and at medium speed at fixed intervals for 32 seconds. As a result, the kneaded material 20 moved up and down, as shown in FIG. 15, so as to be completely kneaded uniformly.

Figure 16:
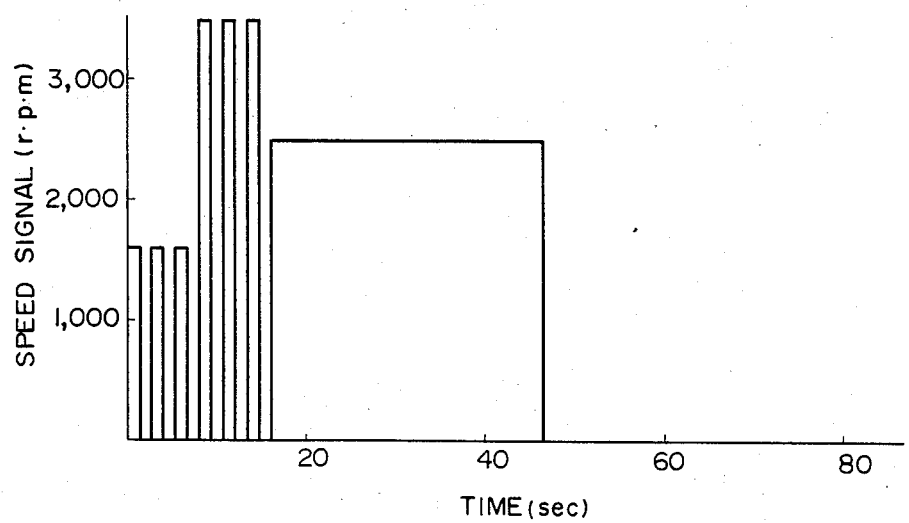
FIG. 16 is a graph showing changes in a speed signal.

FIG. 16 is a graph showing changes in a speed signal of another food processing pattern in accordance with this embodiment. For the material not required to be sufficiently kneaded, food processing operation may be ended after the continuous driving at medium speed.

In the above described embodiment, even if a material has a large volume, it can be efficiently cut, stirred, mixed or otherwise processed without being spattered, and particularly for materials whose viscosity is increased when mixed up, food processing operation is performed extremely effectively, so that a uniform state of completion can be obtained.

Although the present invention has been described and illustrated in detail, it is clearly understood that the same is by way of iilustration and example only and is not to be taken by way of limitation the spirit and scope of the present invention being limited only by the terms of the appended claims.

What is claimed is:

1. A food processor comprising:
    a rotor rotatably provided in a container for processing food,
    a motor combined with said rotor for rotating said rotor,
    first storage means for storing a plurality of preprogrammed food processing data, each of said data having a plurality of data groups including speed data for determining rotational speed of said motor, time data for determining operation time of said motor and mode data for determining whether said motor is to be driven continuously or intermittently,
    selecting means for selecting arbitrary food processing data from said plurality of food processing data and for providing said data groups included in the selected food processing data successively from said first storage means,
    motor control means responsive to said data groups from said first storage means for controlling the rotational speed of said motor and the operation time of said motor,
    a group of switch means for manually setting said data groups, said group of switch means including rotational speed setting switches, operation time setting switches and intermittent operation setting switches, and
    second storage means for storing the data groups set by said switch means,
    said motor control means being responsive to the data groups from said first or second storage means for controlling the rotational speed of said motor and the operation time of said motor.

2. A food processor in accordance with claim 1, wherein
    said second storage means comprises a random-access memory.

3. A food processor in accordance with claim 1, wherein
    at least one data out of said food processing data includes said data groups for driving intermittently said motor at a relatively low speed and then driving intermittently said motor at a relatively high speed.

4. A food processor in accordance with claim 1, wherein
    at least one data out of said food processing data includes data groups by which the rotational speed of said motor is continuously increased from a relatively low speed to a relatively high speed through a relatively medium speed and after that, two arbitrary rotational speeds are alternatively applied.

5. A food procossor in accordance with claim 1, wherein
    at least one data out of said food processing data includes data groups by which said motor is intermittently driven at a relatively low speed, and after that said motor is intermittently driven at a relatively high speed, and then said motor is continuously driven at a relatively medium speed.

6. A food processor in accordance with claim 1, wherein
    said first storage means comprises a read-only memory.

* * * * *